Dec. 31, 1929.   G. H. FLETCHER   1,741,984
FLEXIBLE GEAR WHEEL
Original Filed Nov. 12, 1923   2 Sheets-Sheet 1

WITNESSES:
C. J. Weller.
W. D. O'Connor

INVENTOR
George H. Fletcher.
BY
Wesley Sloan
ATTORNEY

Dec. 31, 1929. G. H. FLETCHER 1,741,984
FLEXIBLE GEAR WHEEL
Original Filed Nov. 12, 1923 2 Sheets-Sheet 2

WITNESSES:

INVENTOR
George H. Fletcher.
BY
ATTORNEY

Patented Dec. 31, 1929

1,741,984

UNITED STATES PATENT OFFICE

GEORGE HERBERT FLETCHER, OF SHEFFIELD, ENGLAND, ASSIGNOR TO WESTINGHOUSE ELECTRIC & MANUFACTURING COMPANY, A CORPORATION OF PENNSYLVANIA

FLEXIBLE GEAR WHEEL

Original application filed November 12, 1923, Serial No. 674,223, and in Great Britain November 14, 1923. Divided and this application filed April 9, 1927. Serial No. 182,254.

This invention relates to improvements in gear wheels and more especially to flexible gear-wheels for connecting the motors to the truck axles of electric locomotives, street railway, and other propelled vehicles.

An object of my invention is to provide a gear-wheel for the above designated service that shall be particularly adapted to transmit power between rotating parts that are subjected to shock and misalinement.

Another object of my invention is to provide a gear-wheel having a spherical connection or seat between the hub and rim portions and resilient elements therein for transmitting the torque.

Heretofore, a great many forms of flexible gear wheels have been proposed each one of which was usually designed for some particular application or use. The feature commonly embodied in all of them was merely the provision of resilient elements between the toothed rim portion and the supporting hub member of the gear wheel.

My present invention is directed to a flexible gear wheel embodying the resilient feature common in the prior art devices. In addition thereto, I provide a gear wheel having a novel construction of the hub and the rim members that permits axial misalinement therebetween. My purpose is accomplished by providing a spherical seat between the gear hub portion and the toothed rim.

According to a convenient construction of my spherically seated gear wheel, a spherically-curved periphery or seat is turned on the hub portion, which is attached to the car axle, while a separate toothed rim or annulus is turned with a spherically-curved internal surface and arranged to seat on the spherically-curved periphery of the hub portion. The toothed rim or annulus is in this manner permitted to take up such a position that the teeth of the gear wheel are parallel to the teeth of the driving pinion, even when the truck axle is not parallel to the axle of the motor. Alternatively, the driving pinion may be spherically seated.

Furthermore, a resilient drive may be provided between the hub portion and the toothed rim or annulus of the gear wheel. For this purpose, the hub portion is provided with substantially radial projections, and the spherically-curved portion of the toothed rim or annulus is formed with gaps into which the radial projections on the hub portion will freely project. Compression springs are inserted between the projections and suitable abutments on the toothed rim or annulus.

In order that the invention may be clearly understood and readily carried into practice, reference will now be made to the accompanying drawings, wherein a constructional form thereof is illustrated by way of example.

Figure 1:
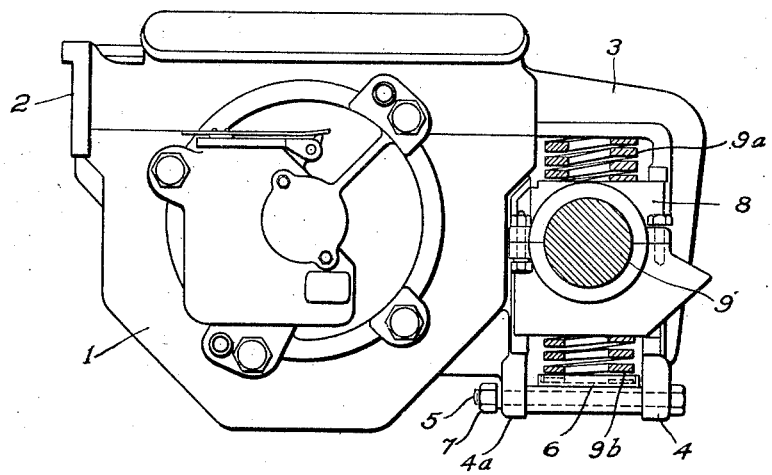
Fig. 1 is a view, in end elevation, showing the arrangement of resilient suspension of a motor upon a truck axle.
Figure 2:
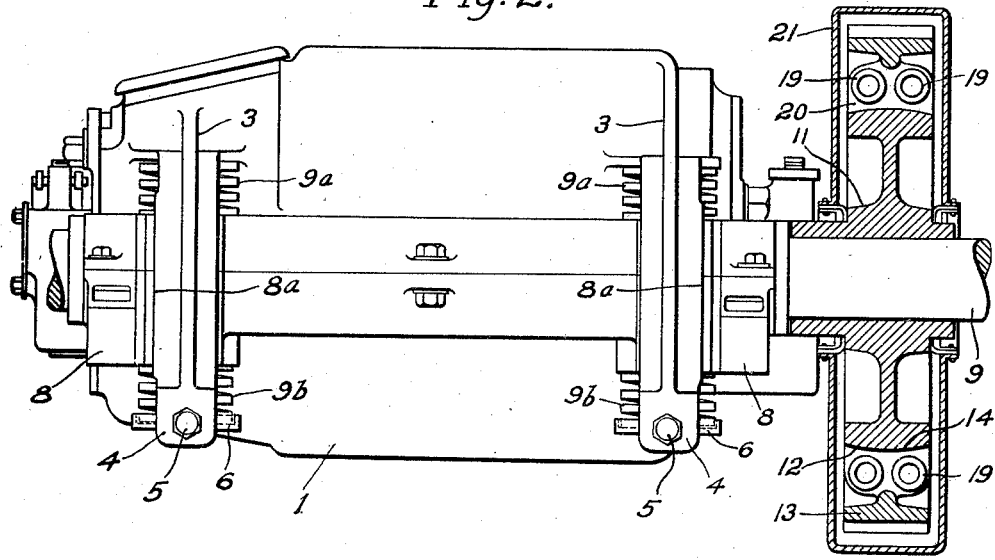
Fig. 2 is a view of the device shown in Fig. 1, partially in side elevation, showing my spherically seated gear wheel in longitudinal section.

Referring to Figs. 1 and 2 of the drawings, the motor 1 is shown as having a seat 2 provided at one side thereof, whereby it may be suspended, in any convenient manner, upon a car or truck (not shown), as by bolting the seat to a transom or suspension bar that is resiliently carried by the truck of the locomotive or car. The motor, at its other side, is provided with two projecting brackets 3, each having depending guide arms 4 and 4ª through which is passed a spindle 5 which carries a supporting plate 6, intermediate the depending guide arms, and is held in position, at its end externally of the arms, by a nut 7. Slidably interposed between each pair of the arms 4 and 4ª, are split bearings 8 embracing the axle shaft 9 of the car and having slide faces 8ª. Helical compression springs 9ª are provided intermediate the upper faces of the bearings 8 and the undersides of the upper portions of the brackets 3, similar springs 9ᵇ being employed between the undersides of the bearings 8 and the plates 6, whereby the car axle side of the motor is resiliently suspended upon said axle, which, it will be understood, is substantially parallel to the axis of the motor shaft.

Figure 3:
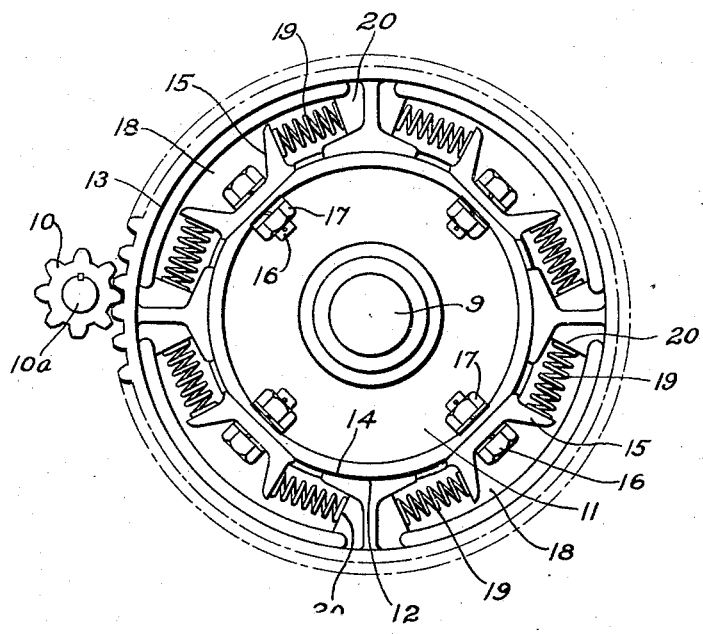
Fig. 3 is a detail view of my gear wheel and a cooperating pinion.

Referring to Figs. 2 and 3 of the drawings, a spherically seated gear wheel, which is adapted to engage a driving pinion 10 on the motor shaft 10$^a$, is provided on the car axle 9 and comprises a hub portion 11 that is rigidly mounted on said axle. The hub portion 11 has a spherically-curved periphery or seat 12 upon which a toothed rim portion 13 is seated. The rim portion 13 has a spherically curved internal surface 14 that is complementary to the periphery 12 of the hub portion 11. Radial projections 15 are secured to the periphery 12 of the hub portion of the gear wheel by bolts 16 and nuts 17, the rim portion 13 having gaps 18 formed internally thereof into which the projections 15 freely project. Compression springs 19 are interposed between said projections 15 and abutments 20 on the rim portion.

A casing 21 is shown in Fig. 2 as enclosing the gear train.

From the above description, it will be understood that, by reason of the motor being resiliently suspended upon the car axle, relative movement of the latter in a vertical direction is permitted. Such relative movement, being tangential to a circle having its centre in the motor axis, will, in practice, vary the distance between the gear centres to a negligible extent only. Correct meshing of the gears, when relative angular displacement takes place between the motor shaft 10$^a$ and the axle 9, is maintained by the provision of the spherically seated gear wheel which permits the teeth of the gear wheel to remain parallel to the teeth of the driving pinion on the motor shaft, notwithstanding relative angular movement of said shaft and axle.

Although I have described a specific embodiment of my invention, it will be obvious to those skilled in the art that various modifications may be made in the details of construction of my flexible gear wheel without departing from the principles defined in the appended claims.

I claim as my invention:

1. A gear element comprising a hub and a rim member having spherical engaging faces and a flexible connection therebetween for permitting relative universal movement of said hub and rim member.

2. The combination with a gear element of a shaft therefor, and resilient connection means for said shaft and the toothed rim of the gear element, said shaft and gear element having spherical engaging faces for permitting universal movement of said rim relative to said shaft.

3. A wheel comprising a hub member and a rim member having spherical engaging faces and a tangentially flexible connection therebetween.

4. A power-transmitting mechanism comprising a driving and a driven member having engaging faces, said engaging faces being substantially upon the surface of a geometrical sphere having its center at the intersection of the axes of rotation of the said driving and driven members and resilient means for transmitting torque therebetween.

5. A flexible gear-wheel comprising a hub member having a spherical peripheral bearing surface, said spherical surface having a radius equal to the maximum radius of said hub member, a rim member having an inner spherical bearing surface of substantially equal radius and resilient connecting means therebetween.

6. A flexible gear wheel comprising a hub member having a spherical peripheral bearing surface, a rim member having a discontinuous inner bearing surface complementary to the bearing surface of said hub member and resilient means for connecting said hub and rim members.

7. A flexible gear-wheel comprising a hub member having a spherical peripheral bearing surface, a rim member having a discontinuous inner spherical bearing surface for engaging the hub member, radial projections on said hub member and resilient means engaging said radial projections and the rim member.

8. A gear element comprising a hub portion having a spherical periphery, radial projecting portions mounted on said hub, a rim portion having internally projecting lugs, said lugs having faces complementary to the spherical periphery of the hub and adapted to cooperate therewith and compression spring elements interposed between the lugs on the rim and the projecting portions on said hub.

9. In a gear-wheel in combination, a hub member, a rim member carried by the hub member, said hub and rim members being disposed for relative universal movement, and resilient means for transmitting motion from the hub member to the rim member.

10. A gear element comprising a hub member, a rim member associated with the hub member and resilient means for transmitting torque from one of said members to the other, said hub member and rim member having cooperating spherical engaging faces.

11. A gear element comprising a hub member, a rim member carried by the hub member, said hub and rim members being provided with engaging faces adapted to permit limited relative universal movement and resilient means for transmitting torque therebetween.

12. A power-transmitting mechanism comprising a hub member, a cooperating rim member carried by the hub member, said hub and rim members being disposed to permit relative universal movement and spring elements interposed between the hub and rim members for transmitting torque.

13. In a gear-wheel, in combination, a hub member, a rim member carried by the hub member, either of said members being adapted to be utilized as a driving or driven member, said hub and rim members being disposed for limited universal relative movement and resilient means for transmitting torque from the driving member to the driven member.

14. The combination with a plurality of journalled axles, of a connecting gear train therefor, said gear train comprising a spherically seated flexible gear-wheel and a solid gear-wheel.

In testimony whereof, I have hereunto subscribed my name this nineteenth day of March 1927.

GEORGE HERBERT FLETCHER.